United States Patent [19]
Webber et al.

[11] Patent Number: 5,263,739
[45] Date of Patent: Nov. 23, 1993

[54] AIR BAG MODULE

[75] Inventors: James L. Webber, Spring Valley; Jeffrey A. Shepherd, Fairborn; Michael W. Donegan, Bellbrook, all of Ohio

[73] Assignee: General Motors Corporation, Detroit, Mich.

[21] Appl. No.: 997,956

[22] Filed: Dec. 28, 1992

[51] Int. Cl.$^5$ .............................................. B60R 21/16
[52] U.S. Cl. ................................... 280/728; 280/743; 280/732
[58] Field of Search ............... 280/728 R, 728 A, 741, 280/743, 732, 736

[56] References Cited

U.S. PATENT DOCUMENTS

| | | | |
|---|---|---|---|
| 3,708,181 | 1/1973 | Mazelsky | 280/740 |
| 4,944,527 | 7/1990 | Bishop et al. | 280/741 |
| 5,096,222 | 3/1992 | Kemerska et al. | 280/732 |
| 5,129,674 | 7/1992 | Levosinski | 280/732 |
| 5,149,130 | 9/1992 | Wooley et al. | 280/743 |

FOREIGN PATENT DOCUMENTS 2322629 11/1973 Fed. Rep. of Germany ...... 280/743

*Primary Examiner*—Margaret A. Focarino
*Assistant Examiner*—Christopher P. Ellis
*Attorney, Agent, or Firm*—Charles E. Leahy

[57] ABSTRACT

A container for an air bag inflator comprises an open-ended cylindrical aluminum or magnesium extrusion having circumferentially-spaced internal ribs, an axial gas discharge opening and a pair of grooved mounting flanges flanking the opening. A cylindrical inflator is inserted through one end of the container on the ribs. An air bag deployment chute includes depending mounting flanges. An air bag, which includes mounting hems having loops, is placed in the chute. A U-shaped retainer is inserted into the hem loops and into the chute channels. This assembly is slid endwise into the container grooves. An end plate is attached to the retainer ends and has a notch to engage an orientation lug on the inflator. In another embodiment, the chute is omitted and the air bag hem loops each receive a mounting rod which are inserted radially into the container grooves. A mounting plate has flanges that are bolted to the container flanges, clamping flanges of an air bag cover in between. The mounting plate includes depending side flanges, which trap the hems and rods in the grooves, and depending end flanges which axially confine the inflator. The end flanges incorporate the orientation slot a protector for inflator wiring. The container ribs space the inflator from the container walls and create insulating air gaps. The air bag hems can also be sewn to the mounting plate flanges, eliminating the mounting rods and enabling use of a simpler container.

7 Claims, 5 Drawing Sheets

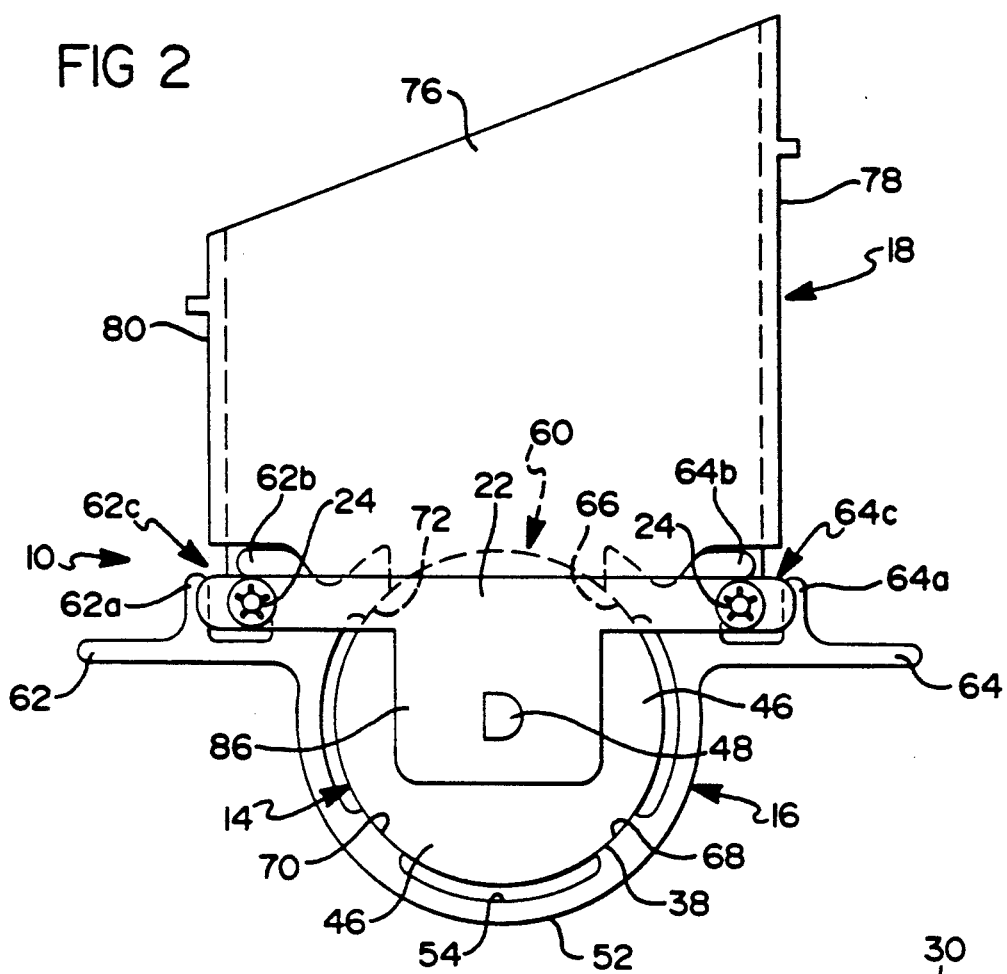
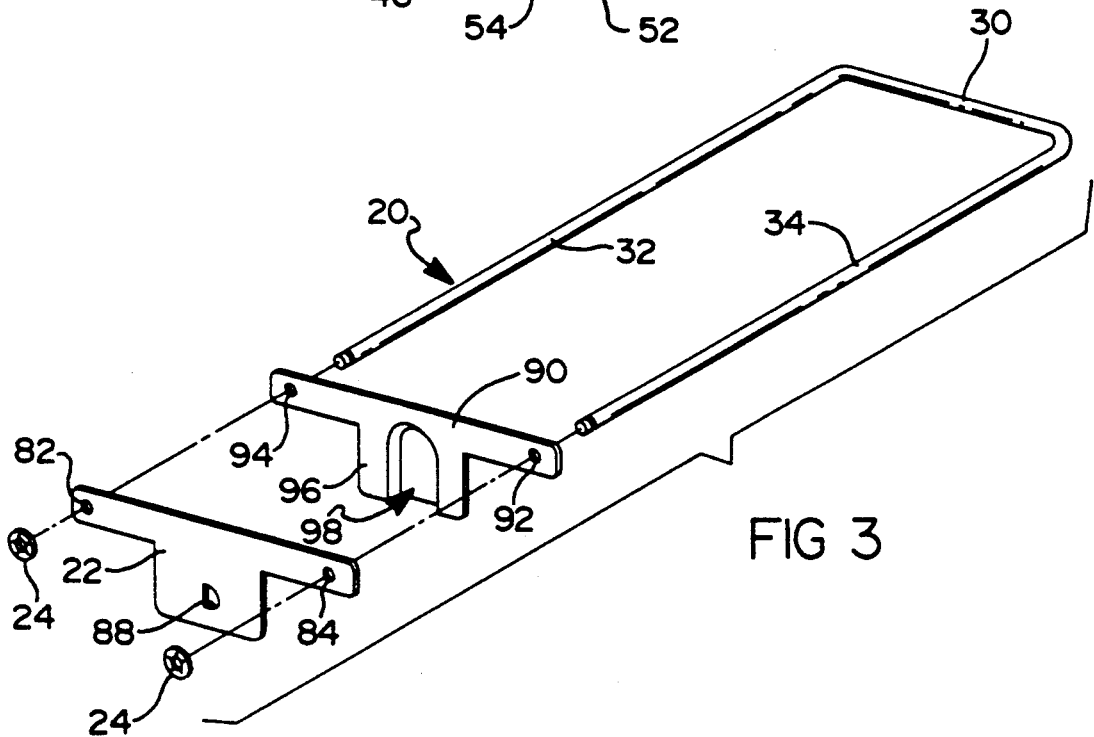

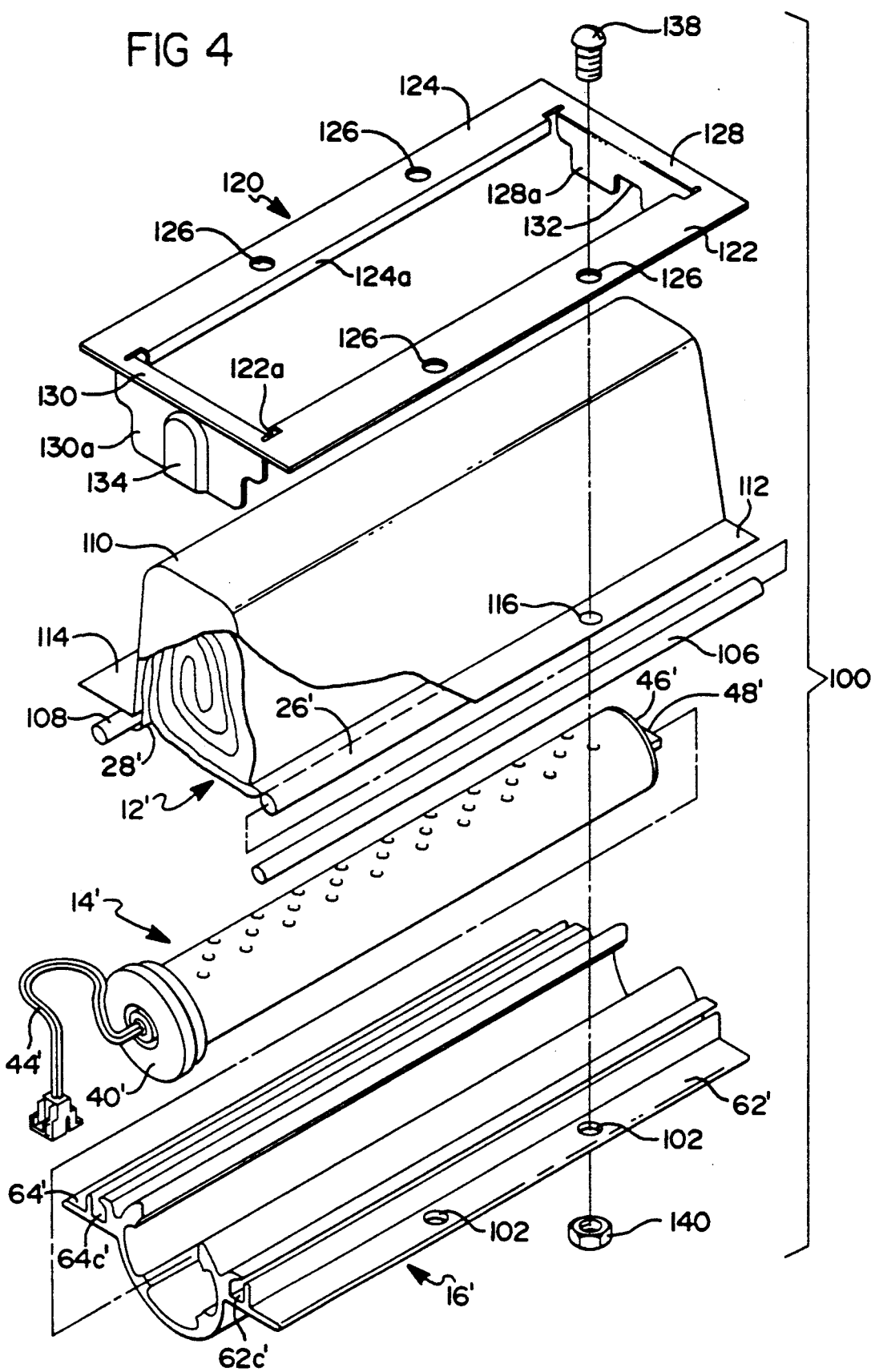

AIR BAG MODULE

BACKGROUND OF THE INVENTION

This invention relates generally to vehicle air bag modules and, more particularly, to air bag modules which incorporate a protective canister for the air bag inflator.

Air bags for use by front seat passengers are becoming more popular. Air bag modules have been developed which are complete in that they contain an inflator, a container for the inflator, an air bag and a deployment chute attached to the container which houses the folded air bag. This module is attached to an instrument panel support structure beneath a cover door or doors formed in or mounted in the front or rear surface of the instrument panel in front of the passenger seat.

The inflator container normally is made of sheet metal and mounts a directional inflator to its bottom. These modules are normally produced and stockpiled for later installation into a vehicle during its assembly. Also, this construction causes the sheet metal containers to become extremely hot during actuation to inflate the air bag.

As an alternative to these modules, some vehicles are designed to incorporate air bag module housings which include the air bag deployment chute in the instrument panel support structure. This enables the use of a simplified air bag module which eliminates the housing. Such a module in current use is known as a "soft pack" assembly and comprises an inflator, a skeletal inflator support and the air bag which lies atop the inflator and is held in place by a cover. This module is attached to the bottom of the integral housing.

The use of the integral housing and an inflator support reduces the cost of the air bag module.

It would be desirable to provide a container for an air bag module which which provides a shield against heat generated by the inflator.

It would also be desirable to provide an air bag container which can be used in both complete and simplified modules which facilitates assembly of the modules.

SUMMARY OF THE INVENTION

It is therefore an object of this invention to provide a container for an air bag module which protects the air bag inflator from damage during handling and which provides a shield against heat generated by the inflator.

It is another object of this invention to provide an air bag container which can be used in both a complete and simplified module and which facilitates assembly of the modules.

In one aspect, this invention features a container for mounting a cylindrical air bag inflator which comprises an open-ended body having an exterior and an interior, an axially-extending gas discharge opening formed in the body, a pair of mounting flanges on the body exterior flanking the opening for mounting an air bag, and a plurality of circumferentially-spaced, axially-extending interior ribs on the body forming a discontinuous cylindrical surface for mounting an inflator in spaced relation to the body interior.

Preferably, the container is an aluminum or magnesium extrusion having a cylindrical interior and exterior with a plate mounted on each end to confine the inflator against axial removal. One plate includes a notch configured to embrace an orientation lug on the inflator to prevent rotation of the inflator relative to the body and the other plate is configured to protect electrical wiring projecting from the inflator.

In another aspect, this invention features an air bag module for installation in a vehicle structure which includes a housing for the air bag module, comprising an air bag having a mounting hem, a cylindrical air bag inflator, and a container. The container comprises an open-ended body having an exterior, a generally cylindrical interior, an axially-extending gas discharge opening formed in the body, a pair of mounting flanges on the body exterior flanking the opening, a plurality of circumferentially-spaced and axially-extending interior ribs on the body for mounting the inflator in spaced relation to the body interior. A mounting plate has side flanges cooperating with the container mounting flanges to secure the air bag mounting hem to the container, with the air bag mounted atop the container.

In yet another aspect, this invention features an air bag module for installation in a vehicle structure which comprises an air bag having a mounting hem, a cylindrical air bag inflator, a container, and an air bag deployment chute. The container comprises an open-ended body having an exterior and a generally cylindrical interior, an axially-extending gas discharge opening formed in the body, a pair of mounting flanges on the body exterior flanking the opening, and a plurality of circumferentially-spaced and axially-extending interior ribs on the body for mounting the inflator in spaced relation to the body interior. The air bag deployment chute houses the air bag atop the container and has side flanges interengageable with the container flanges to secure the chute to the container without additional fasteners.

In still another aspect, this invention features a container for mounting an air bag inflator which comprises an open-ended body formed of an extrusion having a constant cross-section and an exterior and an interior, an axially-extending gas discharge opening formed in the body, a pair of mounting flanges on the body exterior flanking the opening for mounting an air bag, a plurality of circumferentially-spaced and axially-extending interior ribs on the body for mounting an inflator in spaced relation to the body interior, and closure means for confining the inflator against axial removal.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 2 is an end view of the module of FIG. 1;

FIG. 3 is an exploded perspective of another embodiment of the fastening means which secure the inflator and the deployment chute to the container in the module of FIG. 1;

FIG. 4 is an exploded perspective of an air bag soft pack assembly incorporating an inflator container and fastening means in accordance with another embodiment of this invention;

DETAILED DESCRIPTION OF PREFERRED EMBODIMENTS

Figure 1:
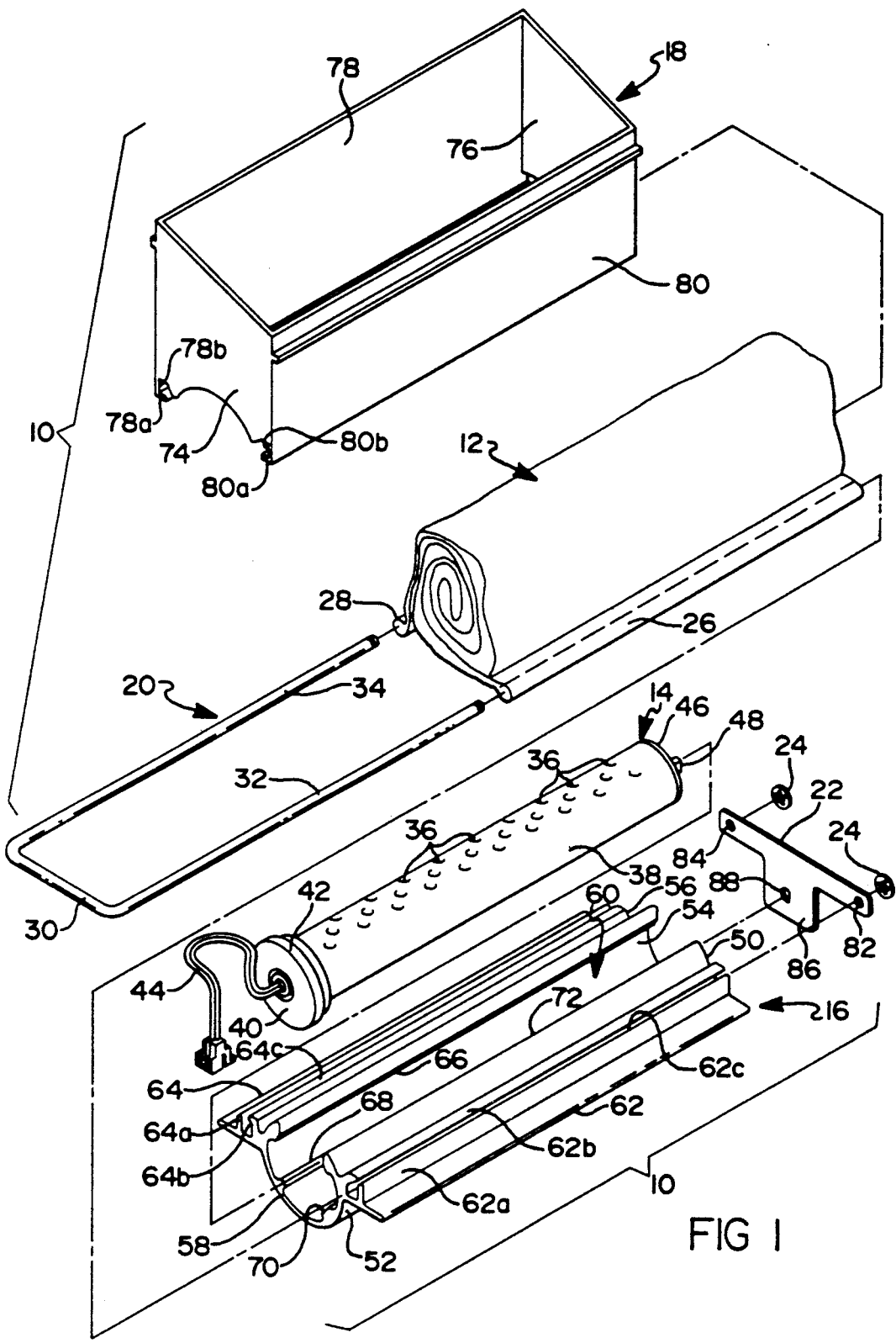
FIG. 1 is an exploded perspective of an air bag module incorporating an inflator container and fastening means in accordance with one embodiment of this invention.

FIG. 1 illustrates the component parts of a complete air bag module, designated in the aggregate as 10. The component parts of module 10 are an air bag 12, an inflator 14 for inflating the air bag, a container 16 for housing the inflator, a deployment chute 18 for housing and directing deployment of air bag 12, a retainer 20 for retaining the air bag 12 and deployment chute 18 assembled to container 16, an end plate 22 for preventing endwise removal of inflator 14 from container 16, and fasteners, or push nuts 24 for securing end plate 22 to retainer 20.

Referring now to FIGS. 1 and 2, air bag 12 is generally of a conventional construction and includes side hems which are here sewn into elongated loops 26 and 28. Retainer 20 is a U-shaped steel or aluminum retainer comprising a bottom segment 30 which connects the side segments that comprise mounting rods 32 and 34 which have threaded ends.

Inflator 14 is in the form of an elongated cylinder which conventionally contains chemicals which ignite to generate gas through ports 36 in outer surface 38. Inflator 14 includes an end cap 40 which has an enlarged flange 42. Ignition wiring 44 extends from end cap 40 for connection to an ignition circuit in a vehicle upon installation. Inflator cylinder 14 includes an integral end portion 46 which mounts a central orientation lug 48 and has the same outside diameter as outer surface 38.

Container 16 is preferably an extrusion of constant cross-section made of aluminum or magnesium. It comprises a generally cylindrical body 50 having an exterior 52, an interior 54, and end surfaces 56 and 58. An axial gas discharge slot 60 is flanked by a pair of axially-extending mounting flanges 62 and 64 which extend from container exterior 52. Ribs 62a, 62b and 64a, 64b extend from flanges 62 and 64 to form axially-extending grooves 62c and 64c.

Four circumferentially-spaced axial lobes or ribs 66, 68, 70 and 72 extend radially inward from container interior 54. Ribs 66-72 are preferably narrow and equally spaced to form a discontinuous cylindrical surface having an inside diameter slightly larger than the outside diameter of inflator cylindrical surface 38 and end cap 46.

Deployment chute 18 is a rectangular box having an open top and bottom defined by spaced end walls 74 and 76 and side walls 78 and 80. Side walls 78 and 80 have depending C-shaped flanges 78a and 80a which define axially-extending grooves 78b and 80b. Each of the end walls includes a lower circular cutout having the same diameter as the diameters of container exterior 52 and of inflator flange 42. Chute 18 can be made from either die cast aluminum or magnesium, but is preferably made from an injection molded polymer.

End plate 22 is a T-shaped flat steel or aluminum plate which incorporates a pair of mounting holes 82 and 84 that are spaced to receive mounting rods 32 and 34. End plate 22 includes a lower flange 86 which contains an orientation notch 88 which is configured to embrace inflator orientation lug 48 and matches its shape.

Assembly of module 10 is preferably accomplished by the following steps, as illustrated in FIG. 1:

a. The smaller end of inflator 14 (containing end cap 46) is inserted into container 16, with discharge ports 36 aligned with gas discharge slot 60, by sliding exterior 38 on ribs 66–72 until end cap flange 42 engages container end surface 58.

b. The folded air bag is placed inside chute 18, with hem loops 26 and 28 hanging below chute sides 80 and 78 sides.

c. Hem loops 26 and 28 are placed on chute flanges 80a and 78a, in grooves 80b and 78b.

d. Mounting rods 32 and 34 are inserted into hem loops 26 and 28, forming an assembly of air bag 12, chute 18 and retainer 20.

e. This assembly is assembled endwise onto container 16 with chute flanges 80a and 78a interengaging container flanges 62a, 62b and 64a, 64b to lock hem loops 26 and 28 and mounting rods 32 and 34 in container grooves 62c and 64c, which are now coextensive with respective chute grooves 80b and 78b against outward removal from grooves 62c and 64c (i.e. radial removal).

f. End plate 22 is attached to the ends of mounting rods 32 and 34 and push nuts 24 are applied to lock retainer 20 in place.

g. If necessary, the inflator is rotated to orient the gas discharge ports in the registry with container gas discharge slot 60 and with lug 48 mating with end plate notch 88 to enable installation of end plate 22.

The assembled parts of module 10 are held against axial separation by bottom segment 30 of retainer 20 and by end plate 22. The interengaging flanges on the container and on the chute prevent radial separation of the parts. Actuation of inflator 14 will generate pressure gas from ports 36 through slot 60 to inflate air bag 12, which will deploy through chute 18 in a well-known manner. During inflation and deployment, the bottom of air bag 12 is held firmly by retention of hem loops 26 and 28 and rods 32 and 34 in grooves 80b, 62c and 78b, 64c.

The provision of ribs 66, 68, 70 and 72 facilitates assembly and heat shielding. They reduce the amount of surface contact between inflator 14 and container 16. The narrow, spaced ribs also reduce the amount of force needed to press the inflator into the container because of the reduced amount of surface contact. The reduced surface contact also reduces heat transfer to the outer surface of container 16 upon actuation (ignition) of inflator 14. The air gaps or pockets between container ribs 66 and 68, 68 and 70, and 70 and 72 (see FIG. 2) help control heat transfer into container 16. These gaps can be increased or decreased according to a particular application.

FIG. 3 illustrates a slight modification which adds another end plate 90 to module 10. End plate 90 is also T-shaped and includes mounting holes 92 and 94, which are spaced to receive mounting rods 34 and 32, and a depending flange 96, which is stamped to form a pocket 98 for protecting the inflator ignition wiring 44. In assembly, end plate 90 is first assembled to retainer 20 before insertion of mounting rods 32 and 34 into hem loops 26 and 28.

Figure 5:
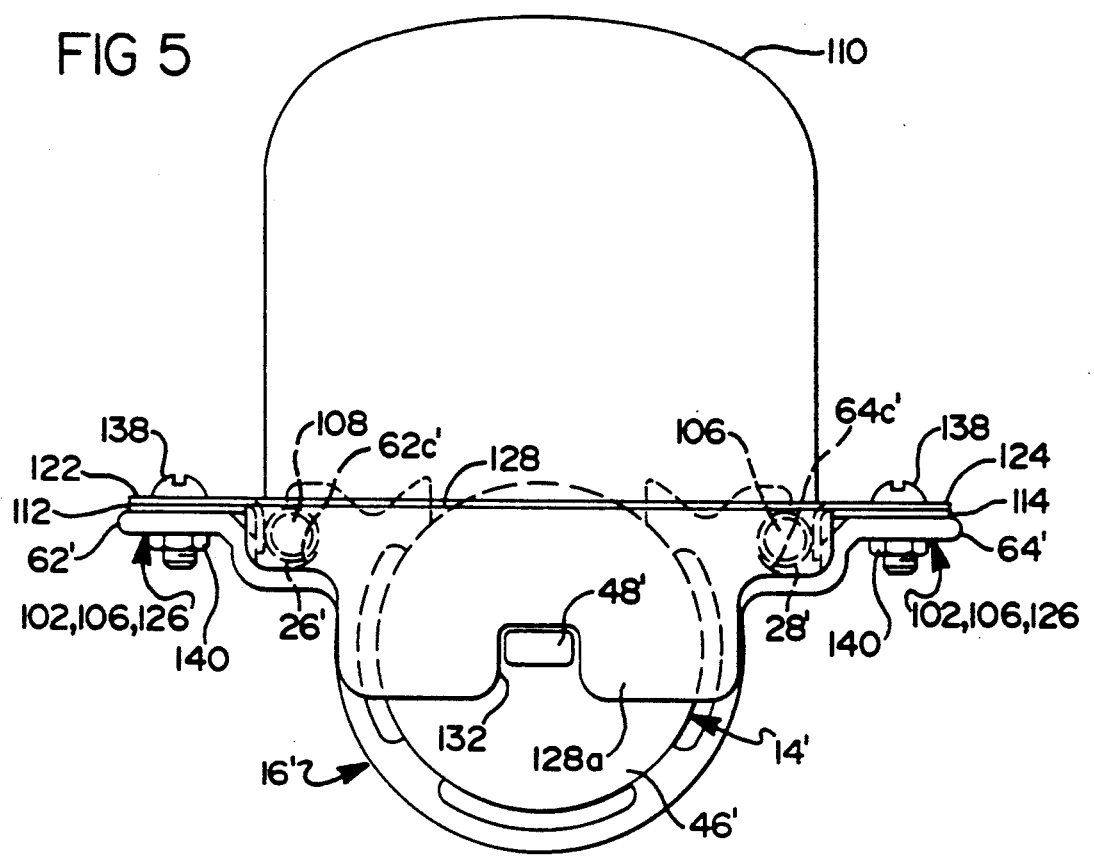
FIG. 5 is one end view of the assembly of FIG. 4.
Figure 6:
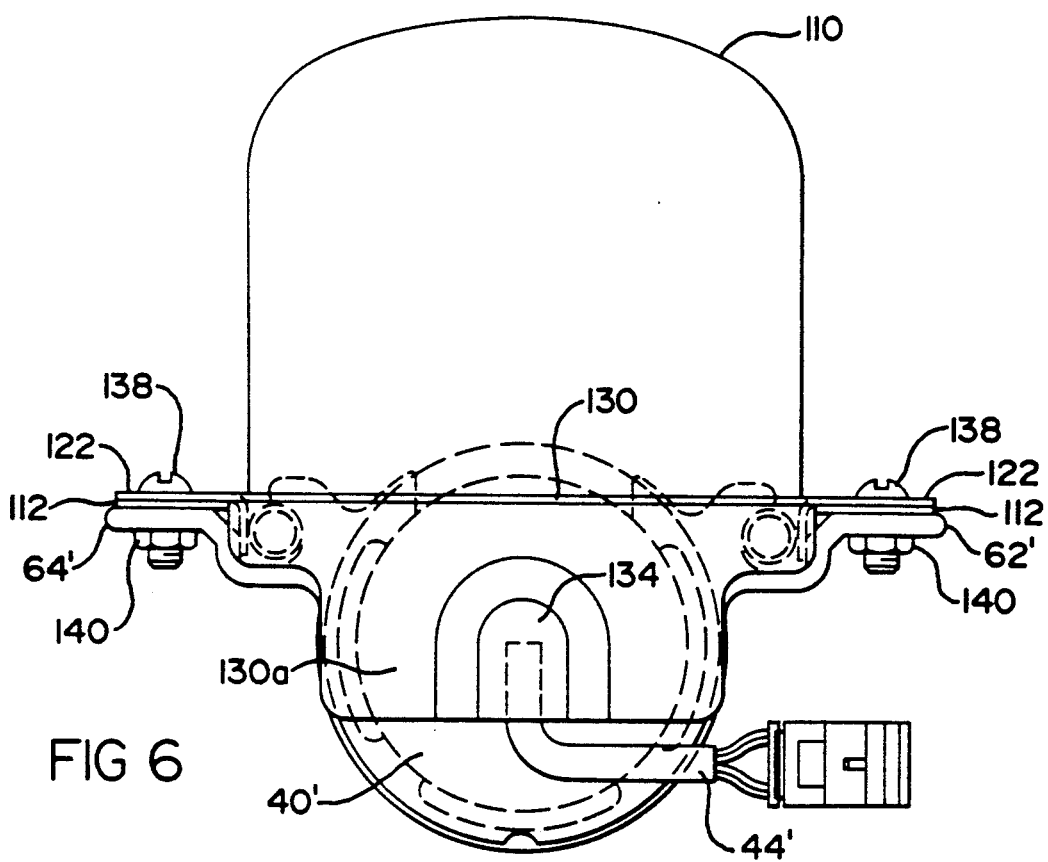
FIG. 6 is the other end view of the assembly of FIG. 4.

FIGS. 4, 5 and 6 illustrate a modification comprising another embodiment of this invention which eliminates the deployment chute to provide a simplified, or socalled "soft pack", air bag module 100. Module 100 is designed for installation into a vehicle which incorporates the deployment chute, or air bag housing, in its instrument panel structure. In this embodiment, like elements are denoted by the same reference numerals as in the FIG. 1 and container 16').

Container 16' is slightly modified to include mounting holes 102 in flanges 62' and 64'. It is otherwise identical to container 16. Separate mounting rods 106 and 108 are inserted into air bag hem loops 26' and 28' in place of the integral rods of retainer 20. Air bag 12' is held in place by a cover 110 (in place of the "hard" chute 18), which has side flanges 112 and 114 that include mounting holes 116.

A mounting plate 120 is provided to assemble module 100. Mounting plate 120 has a central opening defined by side flanges 122 and 124, each having mounting holes 126, and end flanges 128 and 130 Side flanges 122 and 124 have inward downturned flaps 122a and 124a, while end flaps 128 and 130 have inner depending end plate portions 128a and 130a. End plate portion 128a includes an orientation notch 132 which is configured to embrace an orientation lug 48' on inflator 14' and matches its shape. End plate portion includes a stamped out pocket 134 for accommodating and protecting ignition wiring 44' extending from inflator end cap 40'.

Assembly is as follows:
a. Inflator 14' is assembled to container 16' as above.
b. Mounting rods 106 and 108 are inserted into hem loops 26' and 28'.
c. Air bag 12' is placed atop container 16' and hem loops 26' and 28' with mounting rods 106 and 108 are radially inserted into container grooves 62c' and 64c'.
d. Cover 110 is placed over air bag 12', with flanges 112 and 114 overlying container flanges 62' and 64'.
e. Mounting plate 120 is placed over cover 110, with holes 126 of side flanges 122 and 124 aligned with cover flange holes 116 and container flange holes 102.
f. Bolts 138 are inserted through the aligned holes to engage nuts 140, clamping the flanges and securing mounting plate 120 and cover 110 to container 16'.

As assembled, mounting plate side flaps 122a and 124a enter container grooves 62c' and 64c' to trap hem loops 26' and 28' and rods 106 and 108 against radial removal. Axial removal of rods 106 and 108 is prevented by end plates 128a and 130a, as shown in FIGS. 5 and 6. Proper orientation of inflator 134' is assured by the mating of notch 132 in end plate 128a with orientation lug 48', as shown in FIG. 5. FIG. 6 shows how pocket 134 in end plate 130a protects wiring 44' as it enters end cap 40'.

Figure 7:
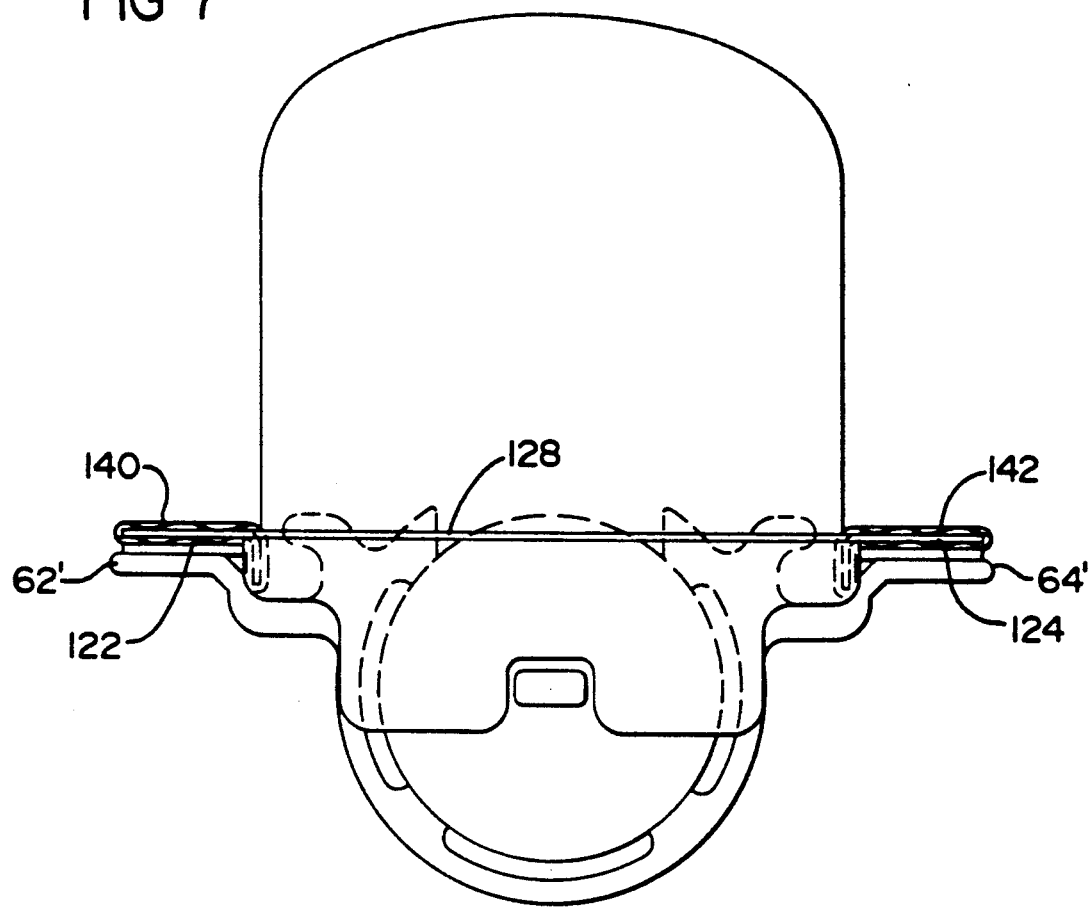
FIG. 7 is a view similar to that of FIG. 5, but illustrating another embodiment of the fastening means.

FIG. 7 illustrates another embodiment of this invention in which the air bag hem loops and the mounting rods are eliminated. Here, the hems 140 and 142 of the air bag are looped around and sewn over the side flanges 122 and 124 of the mounting plate. Holes are then pierced in the hem fabric and the mounting plate flanges 122 and 124, with air bag hems 140 and 142 attached, are bolted to container flanges 62' and 64' as above.

Figure 8:
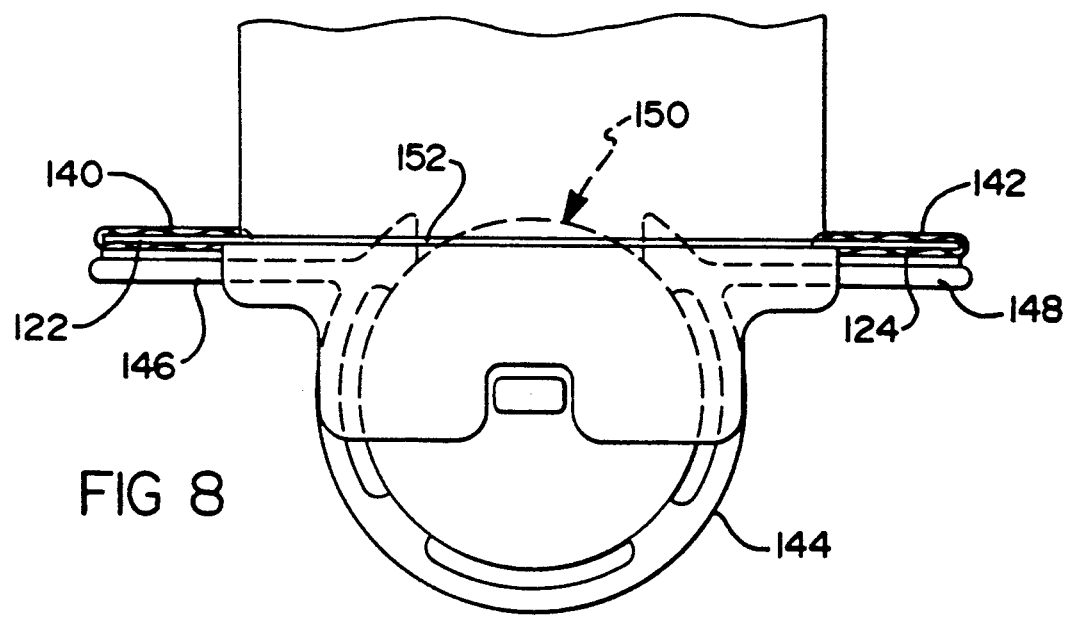
FIG. 8 is a view similar to that of FIG. 5, but illustrating another embodiment of the container.

FIG. 8 shows yet another embodiment of this invention. Here, the air bag is attached to mounting plate 152 as in the FIG. 7 embodiment. However, since the mounting rods have been eliminated, a simpler container structure, which eliminates the flange grooves, can be used. Container 144 includes flat side flanges 146 and 148 flanking gas discharge slot 150. The mounting plate is also simplified. Here, mounting plate 152 includes side flanges 122 and 124 as above, but eliminates the downturned flaps 122a and 124a. The result is a container 144 and mounting plate 152 designed specifically for this type of soft pack air bag module.

Thus, this invention provide a container for an air bag module which can be used in both complete and simplified modules and which facilitates assembly of the modules.

While only preferred and alternate embodiments have been illustrated and described, obvious modifications thereof are contemplated within the scope of this invention and the following claims. For example, the inflator container could be an extrusion of another geometric shape, such as a square or a hexagon, with the side walls including ribs or comprising the ribs mounting the inflator. The corners would provide the air gaps. Also, the inflator could be of another geometric shape, with the container being of a complementary shape.

We claim:

1. An air bag module for installation in vehicle structure, comprising
   an air bag having a mounting hem,
   a cylindrical air bag inflator,
   a container comprising an open-ended body having an exterior and a generally cylindrical interior, an axially-extending gas discharge opening formed in the body, a pair of mounting flanges on the body exterior flanking the opening, and a plurality of circumferentially-spaced and axially-extending interior ribs on the body for mounting the inflator in spaced relation to the body interior, and
   an air bag deployment chute for housing the air bag atop the container and having side flanges interengageable with the container flanges to secure the chute to the container without additional fasteners.

2. The air bag module of claim 1, including a pair of mounting rods, wherein the air bag mounting hem comprises a pair of loops each containing a mounting rod, and the container mounting flanges each include an axially-extending groove for axially receiving an air bag hem loop and rod for confinement by the deployment chute side flanges, upon axial assembly of the chute to the container, against radial removal.

3. The air bag module of claim 2, including restraint means mounted on the body ends for confining the inflator against axial removal.

4. The air bag module of claim 3, including a U-shaped retainer, the bottom segment of which comprises one of the restraint means and the side segments of which comprise the mounting rods, and an end plate secured to the open end of the U--shaped retainer to provide the other restraint means.

5. The air bag module of claim 4, including a second end plate received on the U-shaped retainer adjacent its bottom segment providing the other restraint means, wherein the inflator has electrical wiring projecting from one end and an orientation lug projecting from the other end, one end plate includes a guard for protecting the wiring, and the other end plate includes a notch configured to embrace the orientation lug to prevent rotation of the inflator relative to the body.

6. A method of assembling an air bag module which includes an open-ended container having axially-extending internal ribs, a gas discharge slot and grooved mounting flanges flanking the slot; a cylindrical inflator; an air bag having hem loops; a chute having depending flanges; a retainer having a pair of mounting rods; and an end plate, comprising the steps of
 a. inserting the inflator endwise into the container on the ribs,
 b. placing the folded air bag in the chute,
 c. placing the hem loops on the chute flanges,
 d. inserting the mounting rods into the hem loops,
 e. assembling the chute, air bag and retainer endwise onto the container with the flanges interengaging to lock the hem loops and mounting rods against radial removal,
 f. attaching the end plate to the rod ends to lock the retainer in place.

7. The method of claim 6, wherein the inflator includes an end orientation lug and directional gas discharge ports, and the end plate includes a notch configured to embrace the lug, further comprising the step of
 g. orienting the inflator with the gas discharge ports in registry with the container gas discharge slot and with the lug mating with the end plate notch after installation.

* * * * *